(12) United States Patent
Takahashi

(10) Patent No.: US 9,053,538 B2
(45) Date of Patent: Jun. 9, 2015

(54) IMAGE PROCESSING APPARATUS, IMAGE PROCESSING METHOD, AND COMPUTER RECORDING MEDIUM FOR REDUCING AN AMOUNT OF NOISE INCLUDED IN AN IMAGE

(75) Inventor: Naoto Takahashi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/587,126

(22) Filed: Aug. 16, 2012

(65) Prior Publication Data

US 2013/0051697 A1  Feb. 28, 2013

(30) Foreign Application Priority Data

Aug. 31, 2011  (JP) ................. 2011-189024

(51) Int. Cl.
 *G06K 9/40* (2006.01)
 *G06T 5/00* (2006.01)
(52) U.S. Cl.
 CPC ....... *G06T 5/002* (2013.01); *G06T 2207/10016* (2013.01); *G06T 2207/10116* (2013.01); *G06T 2207/20016* (2013.01); *G06T 2207/20076* (2013.01); *G06T 2207/20182* (2013.01)
(58) Field of Classification Search
 USPC ............ 382/128, 132, 275, 265; 378/87, 98.4
 See application file for complete search history.

(56) References Cited

U.S. PATENT DOCUMENTS

| 5,467,380 A * | 11/1995 | De Jonge et al. ............. 378/98.2 |
| 7,379,615 B2 * | 5/2008 | Allouche ....................... 382/260 |
| 2003/0107678 A1 * | 6/2003 | Lin et al. ....................... 348/630 |
| 2010/0220912 A1 * | 9/2010 | Bruder et al. ................. 382/131 |

FOREIGN PATENT DOCUMENTS

| JP | S63-271668 A | 11/1988 |
| JP | 6-047036 A | 2/1994 |
| JP | H10-013740 A | 1/1998 |
| JP | H11-025267 A | 1/1999 |

* cited by examiner

*Primary Examiner* — Chan Park
*Assistant Examiner* — Eueng-Nan Yeh
(74) *Attorney, Agent, or Firm* — Canon USA, Inc., IP Division

(57) ABSTRACT

An image processing apparatus can perform time-sequential weighting addition processing on a moving image constituted by a plurality of frames includes a filter unit configured to obtain an image by performing recursive filter processing on a frame image that precedes a present target frame, which is one of the plurality of frames constituting the moving image, a coefficient acquisition unit configured to acquire a weighting coefficient for the present target frame based on a noise statistic of a differential image between an image of the present target frame and the image obtained by the filter unit, and an addition unit configured to perform addition processing on the moving image constituted by the plurality of frames based on weighting coefficients acquired by the coefficient acquisition unit.

21 Claims, 9 Drawing Sheets

FIG.8A
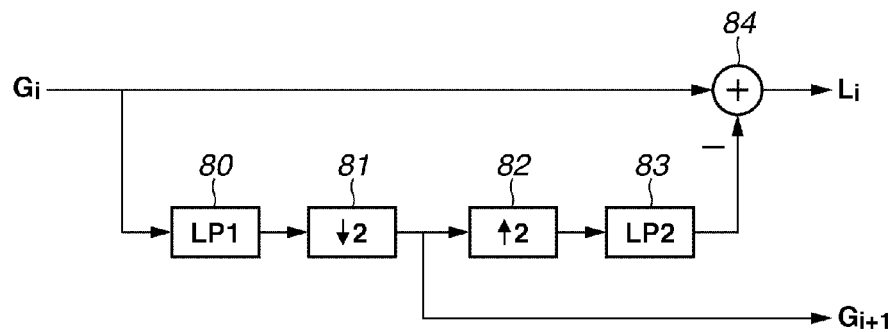
FIG.8B
| 0.0025 | 0.0125 | 0.02 | 0.0125 | 0.0025 |
|---|---|---|---|---|
| 0.0125 | 0.0625 | 0.01 | 0.0625 | 0.0125 |
| 0.02 | 0.1 | 0.16 | 0.1 | 0.02 |
| 0.0125 | 0.0625 | 0.1 | 0.0625 | 0.0125 |
| 0.0025 | 0.0125 | 0.02 | 0.0125 | 0.0025 |
FIG.8C
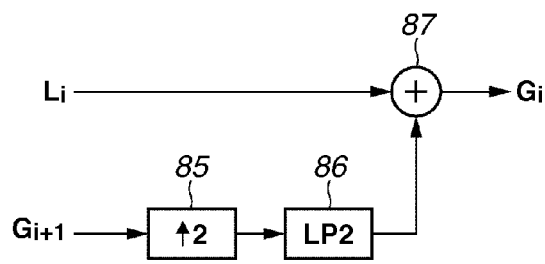

IMAGE PROCESSING APPARATUS, IMAGE PROCESSING METHOD, AND COMPUTER RECORDING MEDIUM FOR REDUCING AN AMOUNT OF NOISE INCLUDED IN AN IMAGE

BACKGROUND OF THE INVENTION

1. Field of the Invention

The present invention relates to a technique capable of reducing an amount of noise included in an image. More particularly, the present invention relates to a technique capable of reducing noise by adding a time-directional image component.

2. Description of the Related Art

In the field of X-ray moving image capturing technology, it is conventionally known that a two-dimensional X-ray moving image capturing apparatus can convert incident X-ray into visible light with a combination of a fluorescent substance and an image intensifier. The image capturing apparatus further includes a TV camera equipped with a charge coupled device (CCD) sensor to capture a visible light image. Another X-ray moving image capturing apparatus that includes a flat panel detector (FPD) operable as an image capturing system is also conventionally known.

However, a moving image obtained by the above-described X-ray moving image capturing apparatus (i.e., a set of a plurality of continuously collected still images, which are hereinafter referred to as "frames") is not free from quantum noises that may be generated by X-ray quantum fluctuations or system noises that may be generated by a detector or a circuit. These noises are superposed on the moving image in sequential image capturing processes.

In particular, the influence of the above-described noises is not negligible when the X-ray moving image capturing apparatus is used in the medical field, because an image capturing operation is performed with a lesser amount of X-ray from the point of view of preventing a measuring object person from being exposed to the X-ray. In this respect, it is important to reduce the noises to improve the image quality.

Therefore, in the field of image processing, it is conventionally proposed to perform weighting addition processing (so-called filtering processing) on pixel values in the time direction or in the space direction to reduce the above-described noises.

More specifically, the time-directional weighting addition processing can reduce the fluctuation of temporally uncorrelated noises by averaging a pixel value of a target frame and a corresponding pixel value of a past frame. Further, the space-directional weighting addition processing can reduce the fluctuation of spatially uncorrelated noises by averaging pixel values of a target pixel and neighboring pixels.

The time-directional weighting addition processing is an ideal method if there is not any temporal signal change between frames, which may be caused by the movement of a measuring object person. However, if a signal change occurs, the image of a past frame (i.e., an afterimage) will appear on the target frame.

In this respect, the space-directional weighting addition processing does not refer to the past frame. Therefore, no afterimage appears. However, the space-directional weighting addition processing is not a desired method in that a spatially non-similar structure (such as an edge boundary) becomes unclear together with the noises.

In view of the foregoing, a method for adequately combining the time-directional weighting addition processing and the space-directional weighting addition processing is discussed in Japanese Patent Application Laid-Open No. 6-47036. The method discussed in Japanese Patent Application Laid-Open No. 6-47036 includes detecting a movement based on a local average difference between a target frame and a past frame and switching the weighting addition processing from the time direction to the space direction if the detected movement is large. The method discussed in Japanese Patent Application Laid-Open No. 6-47036 can realize an ideal noise reduction if there is not any movement, and can suppress the generation of an afterimage in the noise reduction even if there is a movement.

However, when the weighting addition processing is switched between the time direction and the space direction as described above, it is important to accurately extract a movement from a noise containing signal. However, according to the method discussed in Japanese Patent Application Laid-Open No. 6-47036, the influence of a contained noise component is not sufficiently considered.

More specifically, according to the method discussed in Japanese Patent Application Laid-Open No. 6-47036, a movement is detected based on the local average difference between the target frame and the past frame. However, the method cannot strictly determine whether the difference is derived from a temporal signal change caused by the movement of a measuring object person or from a signal change caused by temporal noise fluctuations. Thus, the method discussed in Japanese Patent Application Laid-Open No. 6-47036 cannot accurately determine the movement.

SUMMARY OF THE INVENTION

The present invention is directed to a technique capable of accurately extracting a movement from a moving image while taking noise influences into consideration and capable of realizing an adequate noise reduction based on a result of the extraction.

According to an aspect of the present invention, an image processing apparatus can perform time-sequential weighting addition processing on a moving image constituted by a plurality of frames. The apparatus includes a filter unit configured to obtain an image by performing recursive filter processing on a frame image that precedes a present target frame, which is one of the plurality of frames constituting the moving image. The apparatus includes a coefficient acquisition unit configured to acquire a weighting coefficient for the present target frame based on a noise statistic of a differential image between an image of the present target frame and the image obtained by the filter unit. The apparatus includes an addition unit configured to perform addition processing on the moving image constituted by the plurality of frames based on weighting coefficients acquired by the coefficient acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 8A, 8B, and 8C illustrate an example of the pyramid algorithm.

DESCRIPTION OF THE EMBODIMENTS

Various exemplary embodiments, features, and aspects of the invention will be described in detail below with reference to the drawings.

Figure 1:
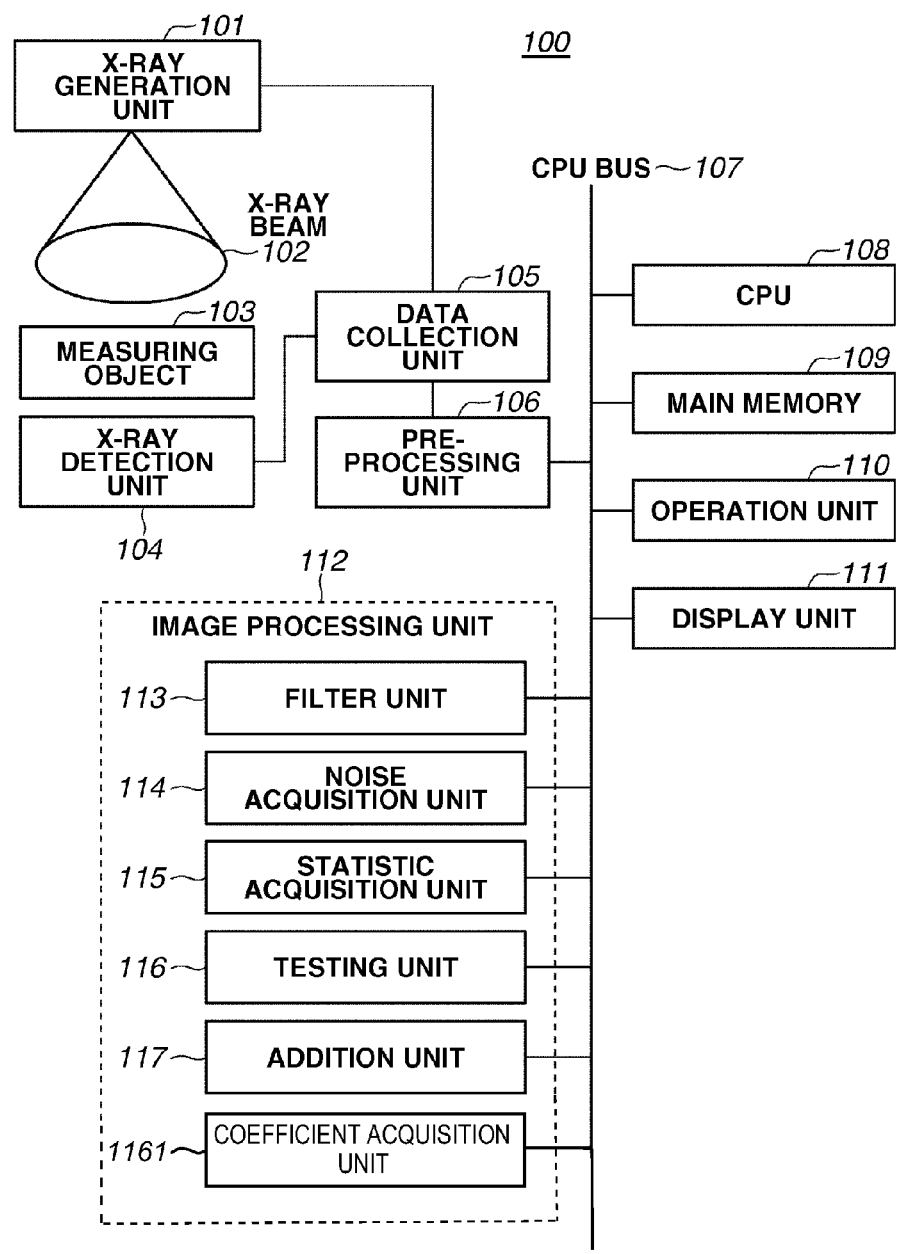
FIG. 1 illustrates an entire configuration of an X-ray moving image capturing apparatus according to first and second exemplary embodiments of the present invention.

The present invention is, for example, applicable to an X-ray moving image capturing apparatus 100 illustrated in FIG. 1. As illustrated in FIG. 1, the X-ray moving image capturing apparatus 100 is an X-ray moving image capturing apparatus capable of performing effective image processing on a captured moving image when the image is output to a monitor.

The X-ray moving image capturing apparatus 100 includes an X-ray generation unit 101, an X-ray detector 104, a data collection unit 105, a pre-processing unit 106, a central processing unit (CPU) 108, a main memory 109, an operation unit 110, a display unit 111, and an image processing unit 112. The constituent components of the X-ray moving image capturing apparatus 100 can transmit/receive data to/from each other via a CPU bus 107 connecting them.

In the above-described image capturing apparatus 100, the main memory 109 can store various data that are necessary for the CPU 108 to perform processing. The main memory 109 is functionally operable as a working memory of the CPU 108. The CPU 108 can perform operational controls of the apparatus 100 in accordance with user instructions input via the operation unit 110, using the main memory 109. The X-ray moving image capturing apparatus 100 can perform the following operations.

First, if an image capturing instruction is input from a user via the operation unit 110, the CPU 108 transmits the image capturing instruction to the data collection unit 105. In response to the received image capturing instruction, the CPU 108 controls the X-ray generation unit 101 and the X-ray detector 104 to execute X-ray moving image capturing processing.

In the X-ray moving image capturing processing, first, the X-ray generation unit 101 irradiates a measuring object 103 with an X-ray beam 102. The X-ray beam 102 having been emitted from the X-ray generation unit 101 penetrates through the measuring object 103 with its strength gradually attenuating, and reaches the X-ray detector 104.

The X-ray detector 104 can continuously output X-ray image signals. In the present exemplary embodiment, the measuring object 103 is a human body. More specifically, the X-ray moving images output from the X-ray detector 104 are human body images.

The data collection unit 105 can convert the X-ray image signals continuously output from the X-ray detector 104 into predetermined digital signals on a frame-by-frame basis and can supply the obtained digital signals as X-ray image data to the pre-processing unit 106.

The pre-processing unit 106 can perform pre-processing (e.g., offset correction or gain correction) on the signals (i.e., X-ray image data) supplied from the data collection unit 105. Under the control of the CPU 108, the X-ray image data having been subjected to the pre-processing in the pre-processing unit 106 can be successively transferred to the main memory 109 and the image processing unit 112 via the CPU bus 107.

The image processing unit 112 can reduce the noise of the moving image by time-sequentially performing weighting addition processing on a moving image constituted by a plurality of frames. The image processing unit 112 includes a filter unit 113 and a noise acquisition unit 114. The filter unit 113 can perform recursive filter processing on a moving image constituted by a plurality of frames in the time direction. The noise acquisition unit 114 can acquire a noise component from the image data of the present target frame.

Further, the image processing unit 112 includes a statistic acquisition unit 115 and a testing unit 116. The statistic acquisition unit 115 can acquire the noise statistic acquired by the noise acquisition unit 114. The testing unit 116 can obtain an evaluation value that indicates whether the noise statistic acquired by the statistic acquisition unit 115 follows a noise distribution acquired beforehand. Further, the image processing unit 112 includes a coefficient acquisition unit (see e.g., the coefficient acquisition unit 1161 as shown in FIG. 1) that can acquire a weighting coefficient determined based on the above-described evaluation value for each of the plurality of frames.

Further, the image processing unit 112 includes an addition unit 117 that can acquire image data of a preceding frame having been previously processed from a memory (not illustrated) and can perform weighting addition processing on image data of the present target frame with the weighting coefficient acquired by the coefficient acquisition unit 1161. Further, the addition unit 117 can store the obtained addition result in the memory. Further, the above-described constituent components are connected to the CPU bus 107.

Figure 2:
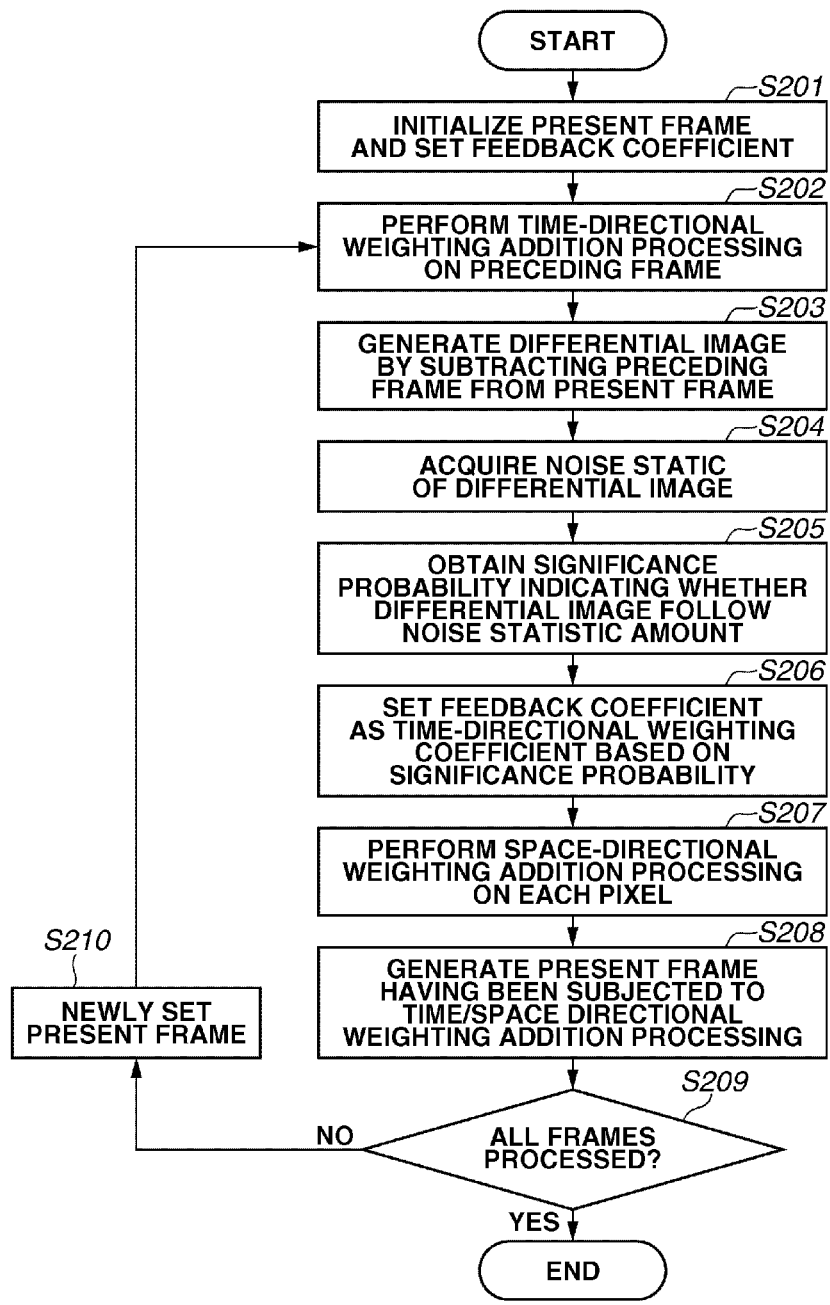
FIG. 2 is a flowchart illustrating an example procedure of the processing that can be performed by an image processing unit 112 according to the first exemplary embodiment of the present invention.

An example operation that can be performed by the image processing unit 112, provided in the X-ray moving image capturing apparatus 100 having the above-described configuration, is described in detail below with reference to a flowchart illustrated in FIG. 2.

As described above, a plurality of frames obtained by the pre-processing unit 106 is transferred to the image processing unit 112 via the CPU bus 107. The image processing unit 112 sets t=2 to designate the present target frame $F_t$ with which the image processing unit 112 starts processing ("t" is a variable representing the frame number in image capturing order, and is an integer not smaller than 1 and not greater than the total number of captured images).

In step S201, the noise acquisition unit 114 sets a feedback coefficient "a." In the present exemplary embodiment, the feedback coefficient "a" is an arbitrary value in the range $0<a<1$ and can be set by a user via the operation unit 110.

Next, in step S202, the filter unit 113 performs time-directional weighting addition processing for all pixels, using each frame preceding the designated present frame $F_t$ and the feedback coefficient "a." More specifically, to perform the time-directional weighting addition processing, the filter unit 113 uses a recursive filter that successively performs feedback addition processing on a processing result of each preceding frame, as defined by the following formula.

$$Fr_{t-1}(x, y) = \begin{cases} F_1(x, y) & t = 2 \\ (1-a) \cdot F_{t-1}(x, y) + a \cdot Fr_{t-2}(x, y) & t > 2 \end{cases}$$ [Formula 1]

In the above-described formula 1, $Fr_{t-1}$ represents a preceding frame image that precedes the present target frame $F_t$. More specifically, $Fr_{t-1}$ represents integrated data that can be obtained by performing time-directional weighting addition processing on the first to the (t−1)th frames. The filter used by the filter unit 113 is not limited to the recursive filter defined by the above-described formula 1. For example, a different recursive filter is usable. Further, a non-recursive filter is usable.

Next, in step S203, the noise acquisition unit 114 generates a differential image Dt by subtracting the time-directional weighting addition processed preceding frame $Fr_{t-1}$ from the present target frame $F_t$. More specifically, the noise acquisition unit 114 performs simple subtraction processing, for all pixels, according to the following formula 2.

$$D_t(x,y) = F_t(x,y) - Fr_{t-1}(x,y)$$ [Formula 2]

Next, in step S204, the statistic acquisition unit 115 acquires a noise variance $\sigma_D^2$ superposed on the differential image Dt as a noise statistic of the differential image.

In the present exemplary embodiment, $\sigma_F^2$ represents the noise variance superposed on the present frame $F_t$, and $\sigma_{Fr}^2$ represents the noise variance superposed on the preceding frame $Fr_{t-1}$ having been subjected to the time-directional weighting addition processing. Further, if it is presumed that the noise is not temporally correlated, according to the additivity of the variance, the noise variance $\sigma_D^2$ superposed on the differential image Dt can be expressed using the following formula 3.

$$\sigma_D^2 = \sigma_F^2 + \sigma_{Fr}^2$$ [Formula 3]

Further, if it is presumed that the noise distribution (e.g., a variance probability distribution) does not cause any temporal change, the second term on the right side of the above-described formula can be modified into the following formula considering the noise variance $\sigma_F^2$ superposed on the present frame $F_t$ and a noise attenuation rate in the time-directional weighting addition processing.

$$\sigma_D^2 = \sigma_F^2 + \left\{ a^{2(t-2)} + (1-a)^2 \cdot \sum_{i=1}^{t-2} a^{2(i-1)} \right\} \cdot \sigma_F^2$$ [Formula 4]

In the above-described formula 4, "a" is the feedback coefficient having been set by a user via the operation unit 110.

The noise variance $\sigma_F^2$ superposed on the present frame $F_t$ includes a quantum noise that is proportional to an X-ray amount received by the detector (i.e., incident X-ray quantum number). Therefore, an actual value of the noise variance $\sigma_F^2$ is variable depending on the incident X-ray amount. More specifically, when $\sigma_Q^2$ represents the quantum noise that is proportional to the X-ray amount received by the detector and $\sigma_S^2$ represents the system noise that does not depend on the incident X-ray amount, and if the quantum noise and the system noise are not correlated with each other, the following formula expresses the variance $\sigma_F^2$ that represents the noise statistic superposed on the present frame $F_t$.

$$\sigma_F^2(V) = \sigma_Q^2 \cdot (V/g) + \sigma_S^2$$ [Formula 5]

In the above-described formula 5, V represents a pixel value of the present target frame $F_t$ and "g" represents a gain coefficient that can be used to convert the pixel value V (which is proportional to the incident X-ray amount) into a value corresponding to the incident X-ray amount.

In the present exemplary embodiment, if the above-described formula is taken into consideration, the noise variance $\sigma_D^2$ superposed on the differential image Dt can be expressed using the following formula 6.

$$\sigma_D^2(V) = \left\{ 1 + a^{2(t-2)} + (1-a)^2 \cdot \sum_{i=1}^{t-2} a^{2(i-1)} \right\} \cdot \{\sigma_Q^2 \cdot (V/g) + \sigma_S^2\}$$ [Formula 6]

Accordingly, it is necessary to estimate the variance $\sigma_D^2$ considering the pixel value V of the present target frame Ft. In the present exemplary embodiment, a pixel value $F_t(x, y)$ of the target pixel (x, y) or a mean pixel value of arbitrary n×n pixels including the target pixel (x, y) at its central region is designated as the pixel value V and the variance $\sigma_D^2$ (V) can be estimated based on the designated pixel value V for all pixels.

The parameters used in the above-described formula 6, i.e., the quantum noise $\sigma_Q^2$, the system noise $\sigma_S^2$, and the gain coefficient g, are values that can be uniquely determined according to image capturing processes. It is feasible to acquire the above-described parameters beforehand. For example, the parameters acquired beforehand can be stored in the main memory 109. The acquired result can be loaded from the memory 109.

Figure 7:
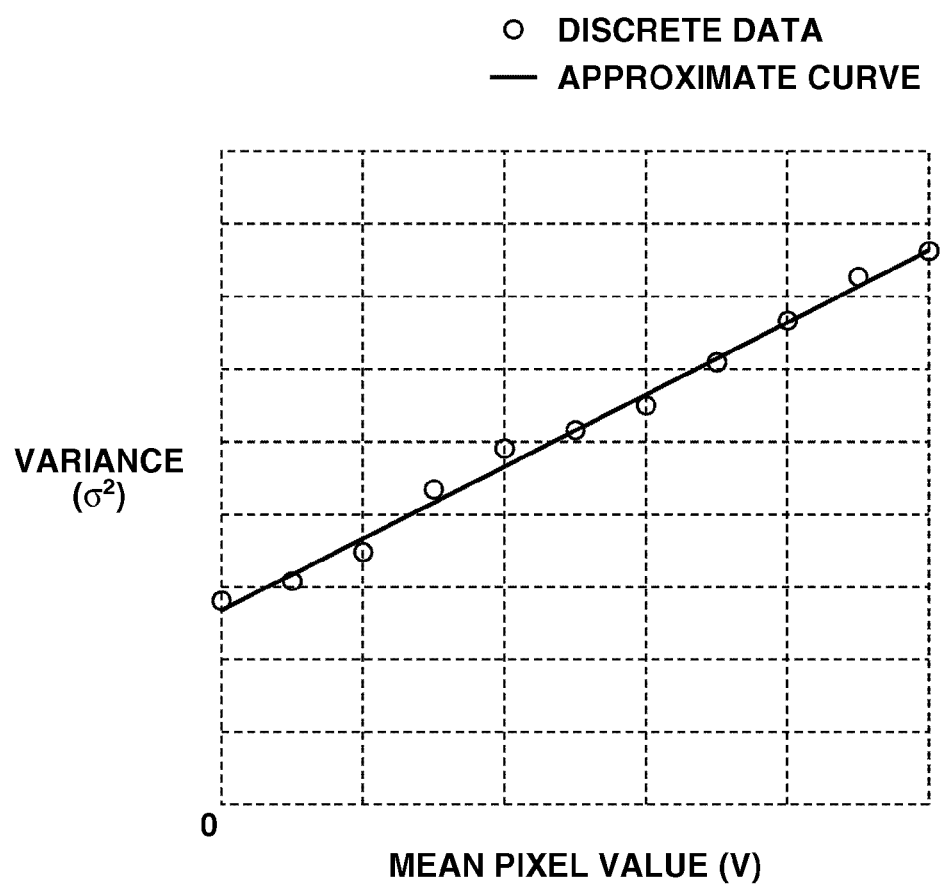
FIG. 7 illustrates an example noise calculation method.

In the present exemplary embodiment, the method for calculating the above-described parameters is not limited to a particular method. For example, an employable method includes performing image capturing operations repetitively (n times) while changing the incident X-ray amount received by the detector in a state where no measuring object is present when a product is inspected, and obtaining discrete data $\{(V_i, \sigma_i^2) = 1, 2, \ldots, n\}$ that represent a relationship between mean pixel value V and variance $\sigma^2$ for each image capturing image as illustrated in FIG. 7, and then calculating parameters that appropriately approximate the discrete data.

More specifically, it is feasible to obtain a parameter that minimizes the sum of squares J of the residual that can be expressed by the following formula using the least squares method and store the obtained parameter beforehand in the main memory 109.

$$J = \sum_{i=1}^{n} \{\sigma_i^2 - \sigma_Q^2 \cdot (V_i/g) - \sigma_S^2\}^2$$ [Formula 7]

Next, in step S205, the testing unit 116 obtains a significance probability as an evaluation value that indicates whether the noise statistic of the differential image Dt obtained by the statistic acquisition unit 115 can follow a noise statistic amount (e.g., a probability distribution of the variance value) that is obtained beforehand.

In the hypothesis test, the significance probability is a probability of realizing a test statistic obtained under a specific hypothesis (null hypothesis). When the significance probability is small, it indicates that the possibility that the hypothesis is established is low. Therefore, in the present exemplary embodiment, the testing unit 116 obtains a significance probability P with respect to a null hypothesis "the noise statistic of the differential image Dt can follow the noise probability distribution $N(\mu, \sigma^2)$ obtained beforehand."

The null hypothesis "the noise statistic of the differential image Dt follows the noise probability distribution $N(\mu, \sigma^2)$" means that the differential image Dt does not include any signal component except for noises. In other words, it means that "there is not any signal change caused by the movement of a measuring object person between differentiated frames."

Therefore, the obtained significance probability P indicates a probabilistic value with respect to the presence of a signal change caused by the movement of the measuring object between differentiated frames. At least one of mean value, standard deviation, and variance of the noise can be used as the noise statistic.

As described above, the noise superposed on the differential image Dt has a probability distribution (i.e., variance) that is variable depending on each pixel. Therefore, in the present exemplary embodiment, a sample set $\Omega$ has a range composed of arbitrary n×n pixels including the target pixel (x, y) at its central region. The testing unit 116 calculates the significance probability P for all pixels with respect to a null hypothesis "the sample set $\Omega$ can follow the noise probability distribution $N(\mu, \sigma^2)$."

In the present exemplary embodiment, a population mean $\mu$ of the noise is 0. Regarding a population variance $\sigma^2$, the variance $\sigma_D^2$ (V) that corresponds to the target pixel (x, y) obtained by the statistic acquisition unit 115 is used as an estimation value. Further, an arbitrary size can be set for "n", e.g., n=3, in the present exemplary embodiment.

The method for calculating the significance probability P is not limited to a particular method. A calculation method according to the present exemplary embodiment includes integrating significance probabilities obtained from the test statistic data that correspond to the population mean $\mu$ and the population variance $\sigma^2$ and calculating the significance probability P that corresponds to the above-described null hypothesis based on the integrated significance probability.

The calculation method includes obtaining a test statistic T that corresponds to the population mean p according to the following formula, for the sample set $\Omega$ having the range composed of arbitrary n×n pixels including the target pixel (x, y) at its central region.

$$T = \frac{E - \mu}{\sqrt{S^2/2n}} \quad \text{[Formula 8]}$$

In the above-described formula 8, E represents a sample mean and $S^2$ represents an unbiased variance. Further, the population mean $\mu$ is 0.

The test statistic T obtained using the above-described formula follows a t-distribution having (2n−1) degrees of freedom, when the population mean is $\mu$. Therefore, a significance probability $P_T$ that corresponds to two-sided test (in which the alternative hypothesis is "population mean is not $\mu$") with respect to the null hypothesis "population mean is $\mu$" can be obtained using the following formula.

$$P_T = \begin{cases} 2(1 - P_{uT}) & P_{uT} > 0.5 \\ 2P_{uT} & P_{uT} > 0.5, \end{cases} \quad \text{[Formula 9]}$$

$$P_{uT} = \int_T^\infty \frac{\Gamma(n)}{\sqrt{\pi \cdot (2n-1) \cdot \Gamma(n-0.5)}} \cdot \left(1 + \frac{x^2}{2n-1}\right)^{-n} dx$$

In the above-described formula 9, $\Gamma(\cdot)$ represents the gamma function.

The significance probability $P_T$ obtained using the above-described formula indicates a probability of establishing a null hypothesis "the population mean of the sample set $\Omega$ is 0." For example, if $P_T=0.01$, the probability that the above-described null hypothesis is correct is equal to 1%. In other words, the probability that the above-described null hypothesis is wrong is equal to 99%. It indicates that the alternative hypothesis "the population mean of the sample set $\Omega$ is not 0" can be established at a very high possibility.

Further, the calculation method includes obtaining a test statistic $\chi^2$ that corresponds to the population variance $\sigma^2$ according to the following formula, for the sample set $\Omega$ having the range composed of arbitrary n×n pixels including the target pixel (x, y) at its central region.

$$\chi^2 = \frac{(2n-1) \cdot S^2}{\sigma^2} \quad \text{[Formula 10]}$$

In the above-described formula 10, $S^2$ represents an unbiased variance. Further, the population variance $\sigma^2$ is the variance $\sigma_D^2(V)$ that corresponds to the target pixel (x, y) obtained by the statistic acquisition unit 115.

The test statistic $\chi^2$ obtained using the above-described formula follows a $\chi^2$ distribution having (2n−1) degrees of freedom, when the population variance is $\sigma^2$. Therefore, a significance probability $P_\chi$ that corresponds to two-sided test (in which the alternative hypothesis is "population variance is not $\sigma^2$") with respect to the null hypothesis "population variance is $\sigma^2$" can be obtained using the following formula.

$$P_\chi = \begin{cases} 2(1 - P_{u\chi}) & P_{u\chi} > 0.5 \\ 2P_{u\chi} & P_{u\chi} \le 0.5, \end{cases} \quad \text{[Formula 11]}$$

$$P_{u\chi} = \int_{\chi^2}^\infty \frac{x^{(n-1.5)} \cdot e^{(-x/2)}}{2^{(n-0.5)} \cdot \Gamma(n-0.5)} dx$$

In the above-described formula 11, $\Gamma(\cdot)$ represents the gamma function.

The significance probability $P_\chi$ obtained using the above-described formula indicates a probability of establishing a null hypothesis "the population variance of the sample set $\Omega$ is $\sigma_D^2(V)$." For example, if $P_\chi=0.01$, the probability that the null hypothesis is correct is equal to 1%. In other words, the probability that the above-described null hypothesis is wrong is equal to 99%. It indicates that the alternative hypothesis "the population variance of the sample set $\Omega$ is not $\sigma_D^2$ (V)" can be established at a very high possibility.

The significance probabilities $P_T$ and $P_\chi$ having been obtained as described above are independently obtained significance probabilities that correspond to the population mean and the population variance of the sample set $\Omega$, respectively. The calculation method according to the present exemplary embodiment indents to obtain the significance probability P that satisfies both of them. More specifically, the calculation method obtains the significance probability P with respect to the null hypothesis "the sample set Ω can follow the noise probability distribution $N(\mu, \sigma^2)$."

To this end, the calculation method includes integrating the obtained significance probabilities $P_T$ and $P_\chi$ and calculating the significance probability P that corresponds to the above-described null hypothesis based on the integrated significance probability. The method for integrating significance probabilities is not limited to a particular method. For example, the Fisher method is usable in the present exemplary embodiment. More specifically, the method includes obtaining a test statistic F that can be calculated by integrating significance probabilities according to the following formula 12.

$$F = -2 \cdot \log(P_T \cdot P_\chi) \qquad \text{[Formula 12]}$$

In the present exemplary embodiment, the integral test statistic F obtained using the above-described formula is an integration of the independently obtained significance probabilities $P_T$ and $P_\chi$. The integral test statistic F follows the $\chi^2$ distribution having four degrees of freedom. Further, the obtained test statistic F takes a larger value when two significance probabilities $P_T$ and $P_\chi$ become smaller. Therefore, the method includes calculating a significance probability P that corresponds to one-sided test (upper side), as defined by the following formula 13.

$$P = \int_F^\infty \frac{x^{(n-1.5)} \cdot e^{(-x/2)}}{2^{(n-0.5)} \cdot \Gamma(n-0.5)} dx \qquad \text{[Formula 13]}$$

The above-described calculation processes finally lead the significance probability P that corresponds to the target pixel (x, y). The calculation method according to the present exemplary embodiment repeats similar processing for all pixels. The significance probability P obtained using the above-described formula indicates that "the sample set Ω follows a noise probability distribution $N\{0, \sigma_D^2(V)\}$".

More specifically, the method obtains a possibility of establishing a null hypothesis "there is not any signal change caused by the movement of a measuring object person in the sample set Ω." For example, if P=0.01, the probability that the null hypothesis is correct is equal to 1%. In other words, the probability that the null hypothesis is wrong is equal to 99%. The alternative hypothesis "there is a signal change caused by the movement of a measuring object person in the sample set Ω" can be established at a very high possibility.

Next, the addition unit 117 performs sequential processing in steps S206 to S208 to realize time/space-directional weighting addition processing based on the significance probability. First, in step S206, the addition unit 117 sets a feedback coefficient "am" as a time-directional weighting coefficient according to the significance probability P obtained for each pixel.

In the present exemplary embodiment, as described above, the significance probability P indicates a probability of establishing a null hypothesis "there is not any signal change caused by the movement of a measuring object person between differentiated frames." If the significance probability P is smaller, the possibility of establishing the alternative hypothesis "there is a signal change caused by the movement of a measuring object person between differentiated frames" becomes higher.

Therefore, in such a case, an afterimage may appear if a larger feedback coefficient is set for a processing result of the preceding frame. Therefore, it is useful to set the feedback coefficient "am" that decreases when the significance probability P becomes smaller, as defined by the following formula 14.

$$am = a \cdot P \qquad \text{[Formula 14]}$$

In the above-described formula 14, "a" is the feedback coefficient having been set by a user via the operation unit 110. The addition unit 117 sets the feedback coefficient "am" to be actually used with reference to the value "a."

The method for setting the feedback coefficient "am" is not limited to the above-described example. For example, as understood from the following formula, it is useful to set 0 (i.e., the time-directional weighting addition processing is not executed) if the significance probability P is less than a predetermined significance level "α", more specifically, when the alternative hypothesis in the hypothesis test is selected. Further, it is useful to set "a" if the significance probability P is equal to or greater than the predetermined significance level "α", more specifically, when the null hypothesis in the hypothesis test cannot be discarded.

$$am = \begin{cases} 0 & P < \alpha \\ a & P \geq \alpha \end{cases} \qquad \text{[Formula 15]}$$

In the above-described formula 15, the significance level "α" can be a value generally used in the hypothesis test (e.g., α=0.01).

As described above, the addition unit 117 sets the feedback coefficient "am" based on the significance probability P by performing the above-described processing for all pixels. The above-described feedback coefficient "am" reflects a movement having occurred in the vicinity of each pixel. In other words, it is feasible to obtain an optimum feedback coefficient in such a way as to reflect a local movement.

Next, in step S207, the addition unit 117 performs space-directional weighting addition processing on all pixels of the present target frame $F_t$. In this respect, the addition unit 117 is functionally operable as a space filter unit configured to perform space filter processing. Although the space-directional weighting addition processing can be performed using a simple space filter (e.g., FIR), a structure that is not spatially similar (e.g., an edge boundary) becomes unclear together with the noises. The space filter employed in the present exemplary embodiment is a ϵ-filter that can be expressed by the following formula. The addition unit 117 performs weighting addition processing using the ϵ-filter to reduce the unsharpness of the structure.

$$Fs_t(x, y) = F_t(x, y) - \sum_{i=-N}^{N} \sum_{j=-N}^{N} h(i+N, j+M) \cdot k \qquad \text{[Formula 16]}$$

$$\{F_t(x, y) - F_t(x+i, y+j)\}$$

$$k(x) = \begin{cases} x & |x| \leq \varepsilon \\ -\varepsilon & x < -\varepsilon \\ \varepsilon & x > \varepsilon \end{cases}$$

In the above-described formula 16, "h" represents a low-pass filter whose size is N×N. For example, an averaging filter whose size is 9×9 is used in the present exemplary embodiment.

The above-described processing uses a similarity index value that represents the difference in pixel value between the target pixel (x, y) and a neighboring pixel. In the above-described processing, if the similarity index value becomes greater than the $\epsilon$ value, a weighting for the low-pass filter that corresponds to the neighboring pixel is reduced. As a result, every non-similar neighboring pixel can be excluded from the space-directional weighting addition processing and the unsharpness of the structure can be suppressed.

In the present exemplary embodiment, the $\epsilon$ value is a threshold usable to determine whether the target pixel (x, y) is similar to the neighboring pixel. In the present exemplary embodiment, the $\epsilon$ value can be set using the following formula 17.

$$\epsilon = 3\sqrt{2\sigma^2} \qquad \text{[Formula 17]}$$

In the above-described formula 17, $\sigma^2$ represents a noise variance superposed on the present frame $F_t$ and a variance $\sigma_F^2(V)$ that corresponds to the target pixel (x, y) obtained by the statistic acquisition unit 115 is used to set the $\epsilon$ value of each pixel.

The above-described formula means that, if it is presumed that the target pixel (x, y) and the neighboring pixel are similar in pixel value except for noise components, the difference between target pixel (x, y) and the neighboring pixel is a signal change caused by fluctuation in noise. If the noise has a normal distribution, the range is $\pm 3\sqrt{2\sigma^2}$ at a probability of approximately 99.7%.

Therefore, by setting the above-described value as the $\epsilon$ value, if the difference in pixel value between the target pixel (x, y) and the neighboring pixel is greater than a presumed fluctuation in noise, it can be determined that its change is not a signal change caused by the fluctuation in noise. More specifically, it can be determined that the target pixel (x, y) is not similar to the neighboring pixel.

As described above, the addition unit 117 performs the space-directional weighting addition processing based on the $\epsilon$ value for all pixels through the above-described processes. Although the filter used in the present exemplary embodiment is the $\epsilon$-filter, the filter is not limited to the above-described example. For example, a Bilateral filter or similar nonlinear filter is employable.

Next, in step S208, the addition unit 117 generates a present frame $Fo_t$ having been subjected to time/space directional weighting addition processing, using a present frame $Fs_t$ having been subjected to the space-directional weighting addition processing and the feedback coefficient "am" obtained in step S206. More specifically, the addition unit 117 executes processing defined by the following formula 18 for all pixels.

$$Fo_t(x,y) = (1-am) \cdot \{(1-b) \cdot F_t(x,y) + b \cdot Fs_t(x,y)\} + am \cdot Fr_{t-1}(x,y) \qquad \text{[Formula 18]}$$

In the above-described formula 18, $Fr_{t-1}$ represents the preceding frame having been subjected to the time-directional weighting addition processing, which is generated by the addition unit 117.

Further, "b" represents a contribution ratio of the space-directional weighting addition processing. The setting of the contribution ratio "b" is performed in such a way as to increase its magnitude when the feedback coefficient "am" becomes smaller. More specifically, if a pixel has a higher possibility of generating an afterimage, a space-directional contribution is increased instead of reducing a time-directional contribution, so that the space filter processing can be performed efficiently and sufficient noise reduction effects can be obtained.

The method for setting the contribution ratio "b" is not limited to a particular method. In the present exemplary embodiment, the contribution ratio "b" is set in such a way that a noise attenuation rate Ro (i.e., a ratio of the noise variance of an output to the noise variance of an input) defined by the above-described formula can be equalized with a reference value R. In the present exemplary embodiment, the noise attenuation rate Ro defined by the above-described formula can be expressed using the following formula 19, when Rs represents a noise attenuation rate in the space-directional weighting addition processing (see the content in the wavy braces of the second term on the right side of the above-described formula 18).

$$Ro = (1-am)^2 \cdot Rs + am^2 \cdot \left\{ a^{2(t-2)} + (1-a)^2 \cdot \sum_{i=1}^{t-2} a^{2(i-1)} \right\} \qquad \text{[Formula 19]}$$

In the above-described formula 19, "a" is the feedback coefficient having been set by a user via the operation unit 110.

Accordingly, the noise attenuation rate to be realized by the space-directional weighting addition processing can be obtained by substituting the reference value R for Ro and solving the formula for Rs. Therefore, the addition unit 117 sets the contribution ratio "b" in such a way as to equalize the noise attenuation rate by the space-directional weighting addition processing with $R_S$. However, it is difficult to obtain an exact solution that can satisfy the above-described condition. Therefore, on the assumption that the noise superposed on the present frame $Fs_t$ having been subjected to the space-directional weighting addition processing is negligible, the addition unit 117 sets an approximate value that can be obtained according to the following formula as the contribution ratio "b."

$$b = 1 - \sqrt{Rs} \qquad \text{[Formula 20]}$$

The reference value R can be set arbitrarily. In the present exemplary embodiment, the setting of the reference value R is performed according to the following formula 21 using the feedback coefficient "a" having been set by a user via the operation unit 110.

$$R = a^{2(t-1)} + (1-a)^2 \cdot \sum_{i=1}^{t-1} a^{2(i-1)} \qquad \text{[Formula 21]}$$

The reference value R defined by the above-described formula is a noise attenuation rate itself that is obtainable by processing the first to the t-th frames using a recursive filter. Accordingly, when the reference value R having been set as described above is used, it is feasible to obtain noise reduction effects that are substantially comparable to those obtainable by the recursive filter using the feedback coefficient "a" for all pixels.

The noise attenuation rate of the recursive filter has time dependency. The value of the noise attenuation rate becomes smaller when the variable "t" becomes greater. Therefore, if the reference value R defined by the above-described formula is used, the noise reduction effects cannot remain the same for respective frames. Therefore, as defined by the following formula, it is useful to set a noise attenuation rate ($t \to \infty$) as the reference value R. In this case, it is feasible to obtain substantially similar noise reduction effects for all frames.

$$R = \frac{(1-a)^2}{1-a^2} \quad \text{[Formula 22]}$$

As described above, the addition unit 117 performs the above-described processing for all pixels to generate the present frame Fo$_t$ whose noise level is sufficiently lowered.

Next, in step S209, the image processing unit 112 determines whether the noise reduction processing has been completed for all frames. If it is determined the noise reduction processing for all frames has not yet been completed (NO in step S209), then in step S210, the image processing unit 112 sets the next frame as the present target frame by incrementing the variable "t" and repeats the above-described sequential processing in steps S202 to S208. If it is determined that the noise reduction processing has been completed for all frames (YES in step S209), the image processing unit 112 terminates the processing of the flowchart illustrated in FIG. 2.

As described above, the image processing according to the first exemplary embodiment can accurately determine a movement by obtaining a probability of a possible movement based on a noise probability distribution. Further, if a pixel has a higher movement possibility, it is feasible to suppress the occurrence of an afterimage by reducing a time-directional feedback coefficient. Further, it is feasible to obtain noise suppression effects uniformly for all pixels by setting the space-directional contribution ratio based on the noise attenuation rate.

Figure 3:
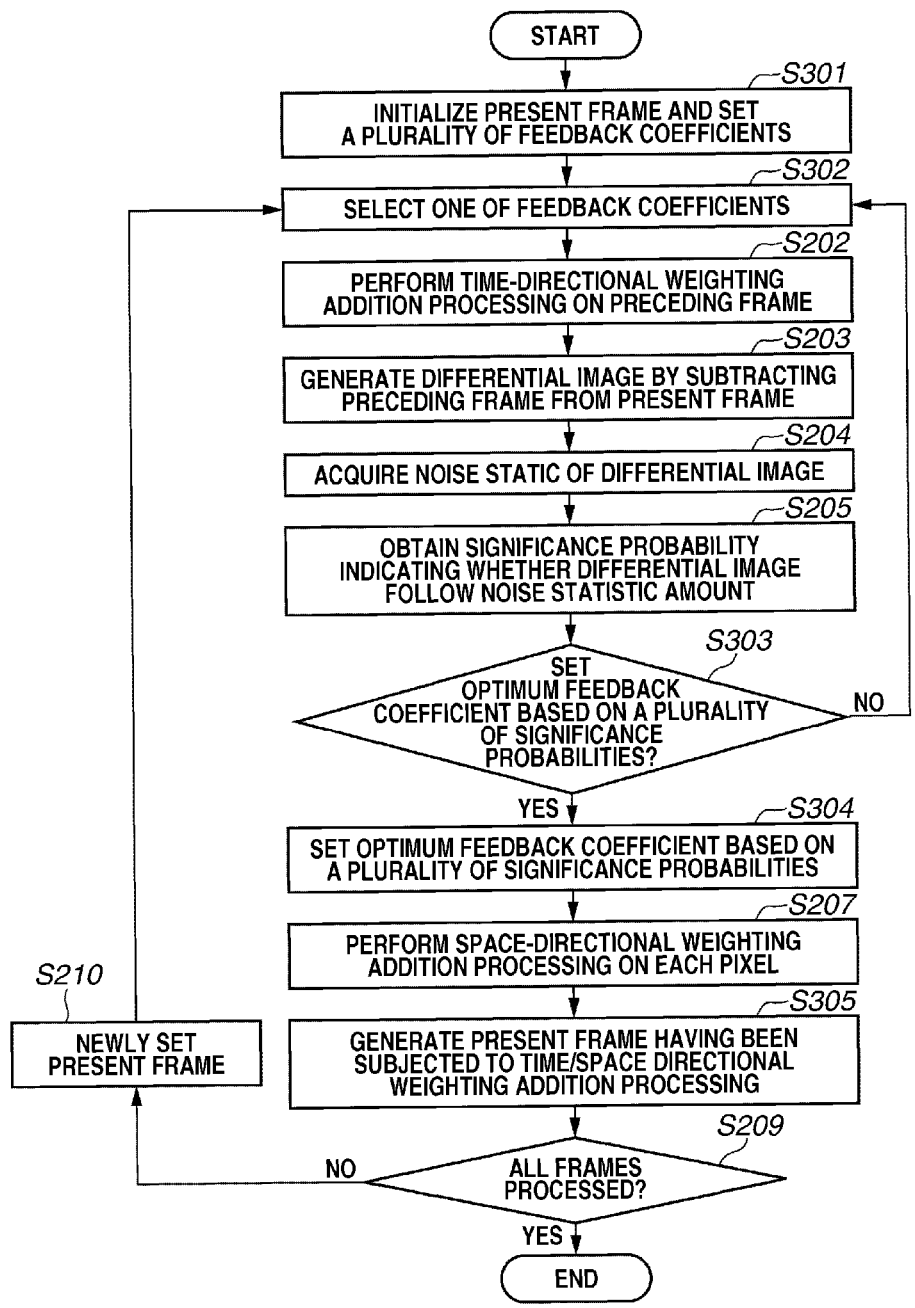
FIG. 3 is a flowchart illustrating an example procedure of the processing that can be performed by the image processing unit 112 according to the second exemplary embodiment.

FIG. 3 is a flowchart illustrating an operation that can be performed by the image processing unit 112 of the X-ray moving image capturing apparatus 100 according to a second exemplary embodiment of the present invention. In the flowchart illustrated in FIG. 3, each step if it executes processing similar to that described in FIG. 2 is denoted by the same step number. In the present exemplary embodiment, only the limited configuration features different from those described in the first exemplary embodiment are described in detail below.

First, in step S301, the image processing unit 112 sets t=2 to designate the present target frame Ft to start processing. The image processing unit 112 further sets a plurality of feedback coefficients {a$_i$|i=1, 2, . . . , n}. In the present exemplary embodiment, the maximum feedback coefficient a$_n$ is equal to the feedback coefficient "a" having been set by a user via the operation unit 110. Each of the remaining feedback coefficients has a value obtainable by dividing the "0-a" range by "n" as defined by the following formula.

$$a_i = a \cdot \frac{i-1}{n-1} \quad \text{[Formula 23]}$$

In the above-described formula 23, "n" is an arbitrary number (e.g., n=10).

Next, in step S302, the image processing unit 112 selects one of the plurality of feedback coefficients having been set in step S301. Subsequently, the image processing unit 112 performs sequential processing in steps S202 to S205 as described in the first exemplary embodiment to obtain a significance probability.

In step S303, the image processing unit 112 determines whether the above-described sequential processing has been repeated for all feedback coefficients to obtain a significance probability {P$_i$|i=1, 2, . . . , n} that corresponds to each feedback coefficient {a$_i$|i=1, 2, . . . , n}.

Next, in step S304, the addition unit 117 sets an optimum feedback coefficient "am", which can be selected from the plurality of feedback coefficients {a$_i$|i=1, 2, . . . , n}. In the present exemplary embodiment, as described above, the significance probability indicates a probability of establishing the null hypothesis "there is not any signal change caused by the movement of a measuring object person between differentiated frames." If the significance probability is smaller, the possibility of establishing the alternative hypothesis "there is a signal change caused by the movement of a measuring object person between differentiated frames" becomes higher.

Therefore, in the present exemplary embodiment, the addition unit 117 sets a feedback coefficient whose significance probability is largest, i.e., a feedback coefficient having a least possibility of establishing the alternative hypothesis, as the optimum feedback coefficient "am."

However, if the maximum significance probability is less than the significance level "α", more specifically, when the alternative hypothesis is selected for all feedback coefficients, the addition unit 117 discards all of the feedback coefficients and sets am=0 (does not perform the time-directional weighting addition processing).

The method for setting the feedback coefficient "am" is not limited to the above-described example. For example, it is useful to set the maximum feedback coefficient selected from the feedback coefficients whose significance probability is greater than the significance level "α" as the optimum feedback coefficient "am." In this case, the addition unit 117 selects a feedback coefficient that can maximize the noise suppression effects, which is one of the feedback coefficients capable of satisfying the significance level "α" having been set.

As described above, the image processing unit 112 performs the above-described processing for all pixels and sets the feedback coefficient "am" based on a plurality of significance probabilities {P$_i$|i=1, 2, . . . , n}.

Next, in step S207, the image processing unit 112 performs space-directional weighting addition processing on all pixels of the present target frame F$_t$. Then, in step S305, the image processing unit 112 generates a present frame Fo$_t$ having been subjected to the time/space directional weighting addition processing, using the present frame Fs$_t$ having been subjected to the space-directional weighting addition processing and the feedback coefficient "am" obtained in step S304. More specifically, the image processing unit 112 performs processing according to the following formula for all pixels.

$$Fo_t(x, y) = (1 - am) \cdot \{(1-b) \cdot F_t(x, y) + b \cdot Fs_t(x, y)\} + am \cdot Fr_{t-1}(x, y) \quad \text{[Formula 24]}$$

$$Fr_{t-1}(x, y) = \begin{cases} F_1(x, y) & t = 2 \\ (1-am) \cdot F_{t-1}(x, y) + am \cdot Fr_{t-2}(x, y) & t > 2 \end{cases}$$

In the above-described formula 24, the contribution ratio "b" can be set based on the noise attenuation rate Ro defined by the above-described formula, as described in the first exemplary embodiment.

According to the above-described formula 24, if am=0, the image processing unit 112 does not perform the time-directional weighting addition processing and performs only the space-directional weighting addition processing. Therefore, if the testing unit 116 sets am=0 for the optimum feedback coefficient (except for a case where all of the feedback coefficients is discarded and am=0 is set), information relating to the immediately preceding frame $F_{t-1}$ is not used even if there is not any signal change caused by the movement of a measuring object person between the present frame $F_t$ and the immediately preceding frame $F_{t-1}$. Therefore, in this case, the image processing unit 112 can perform exceptional processing according to the following formula.

$$Fo_t(x,y)=(1-a)\cdot F_t+a\cdot Fo_{t-1}(x,y) \qquad \text{[Formula 25]}$$

In the above-described formula 25, "a" is the feedback coefficient having been set by a user via the operation unit 110. Further, $Fo_{t-1}$ represents the preceding frame having been subjected to the time/space directional weighting addition processing.

The above-described formula 25 is characterized by performing weighting addition processing on the preceding frame $Fo_{t-1}$ having been subjected to the time/space directional weighting addition processing, instead of executing only the space-directional weighting addition processing. In other words, the processing according to the above-described formula 25 can suppress the unsharpness of a structure (e.g., an edge boundary) because time-directional information can be used additionally.

Next, in step S209, the image processing unit 112 determines whether the noise reduction processing has been completed for all frames. If it is determined that the noise reduction processing for all frames has not yet been completed (NO in step S209), then in step S210, the image processing unit 112 sets the next frame as the present target frame by incrementing the variable "t" and repeats the above-described sequential processing in steps S302 to S305. If it is determined that the noise reduction processing has been completed for all frames (YES in step S209), the image processing unit 112 terminates the processing of the flowchart illustrated in FIG. 3.

As described above, the image processing according to the present exemplary embodiment selects a feedback coefficient having a least-probability risk based on a plurality of significance probabilities, or a feedback coefficient capable of bringing largest noise suppression effects among a plurality of low-probability risk feedback coefficients. Therefore, the image processing according to the present exemplary embodiment can set an optimum feedback coefficient, as understood from the comparison with the image processing described in the first exemplary embodiment.

Figure 4:
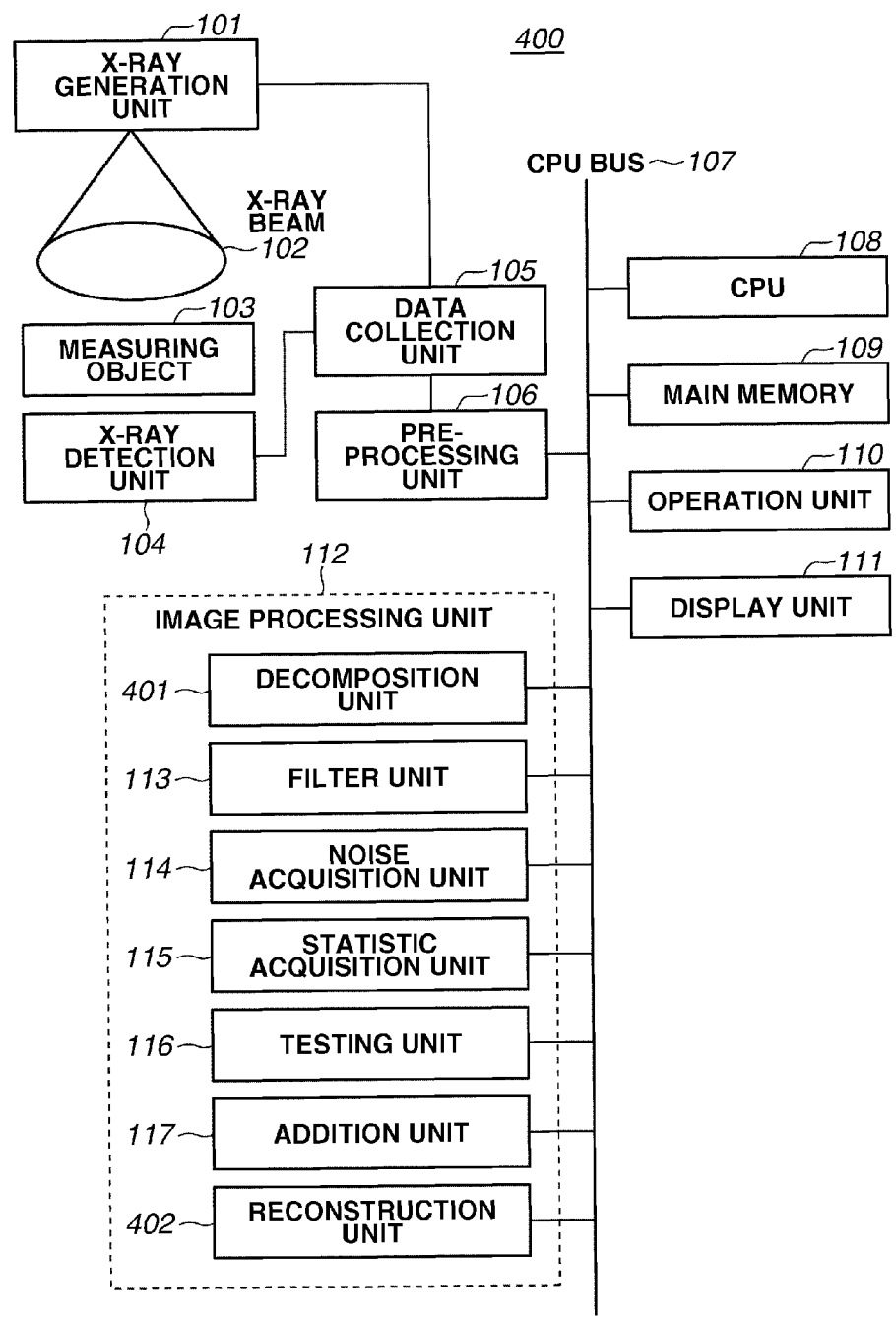
FIG. 4 illustrates an entire configuration of an X-ray moving image capturing apparatus according to third and fourth exemplary embodiments of the present invention.
Figure 5:
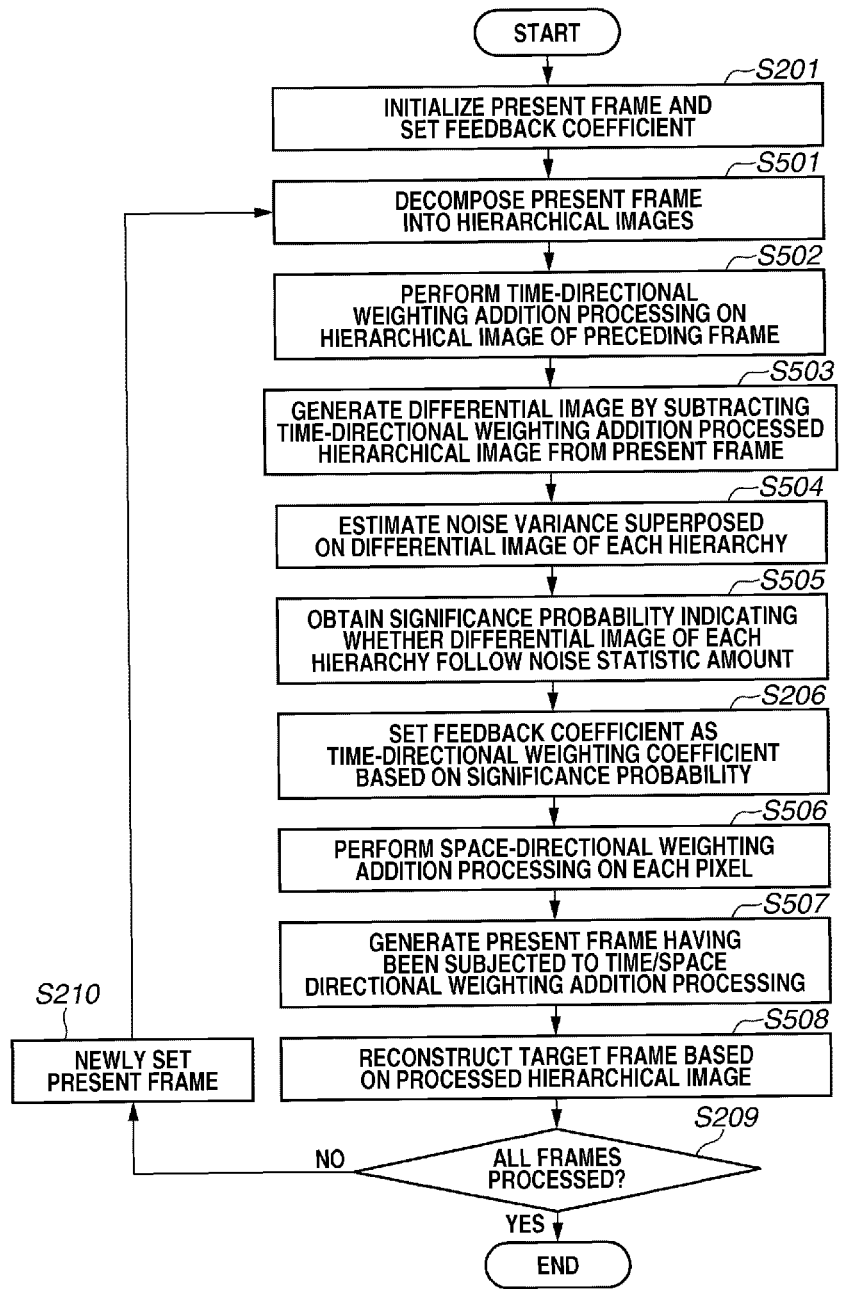
FIG. 5 is a flowchart illustrating an example procedure of the processing that can be performed by an image processing unit 112 according to the third exemplary embodiment of the present invention.

A third exemplary embodiment of the present invention is, for example, applicable to an X-ray moving image capturing apparatus 400 illustrated in FIG. 4. The X-ray moving image capturing apparatus 400 includes a decomposition unit 401 and a reconstruction unit 402 in addition to the constituent components of the X-ray moving image capturing apparatus 100. FIG. 5 is a flowchart illustrating an example procedure of processing that can be performed by an image processing unit 112 of the X-ray moving image capturing apparatus 400.

In the X-ray moving image capturing apparatus 400 illustrated in FIG. 4, constituent components functionally similar to those of the X-ray moving image capturing apparatus 100 illustrated in FIG. 1 are denoted by the same reference numerals and detailed descriptions thereof are not repeated. Further, in the flowchart illustrated in FIG. 5, each step if it executes processing similar to that described in FIG. 2 is denoted by the same step number. In the present exemplary embodiment, only the limited configuration features different from those described in the first exemplary embodiment are described in detail below.

First, in step S201, the image processing unit 112 sets t=2 to designate the present target frame Ft with to start processing and set the feedback coefficient "a", as described in the first exemplary embodiment.

Next, in step S501, the decomposition unit 401 decomposes the present target frame $F_t$ into a plurality of hierarchical images that are differentiated in resolution. In the present exemplary embodiment, the decomposition unit 401 employs a Burt-Adelson pyramid algorithm to decompose the present target frame $F_t$ into hierarchical images.

The decomposition using the pyramid algorithm is described below with reference to FIGS. 8A and 8B. FIG. 8A illustrates one-level decomposition applied to an input image Gi. First, the input image Gi is filtered by a filter 80 illustrated in FIG. 8B, and is converted by a ½ downsampling circuit 81 into a Gaussian image $G_{i+1}$ whose resolution is reduced to a half level in both the vertical and horizontal directions.

Further, a 0 value is inserted to the Gaussian image $G_{i+1}$ by a 2-times upsampling circuit 82. Then, the Gaussian image $G_{i+1}$ is filtered by a filter circuit 83, whose filter coefficients are four times the filter coefficients illustrated in FIG. 8B, to generate an image having a resolution comparable to that of the input image Gi.

Then, a subtracter 84 subtracts the output image of the filter circuit 83 from the input image Gi to generate a Laplacian image $L_i$. Through the above-described operation, the input image Gi can be decomposed into the Gaussian image $G_{i+1}$ and the Laplacian image $L_i$. Further, if a multi-level decomposition is required, it can be realized by repeating similar processing on the output Gaussian image $G_{i+1}$ (which is designated an input image).

The image processing according to the present exemplary embodiment is characterized by designating the present target frame $F_t$ as the first input image and repeating the above-described processing M times to generate a plurality of Gaussian images $\{G_{t,i}|i=0, 1, \ldots, M\}$ and Laplacian images $\{L_{t,i}|i=0, 1, \ldots, M-1\}$ that are differentiated in resolution.

Figure 9A:
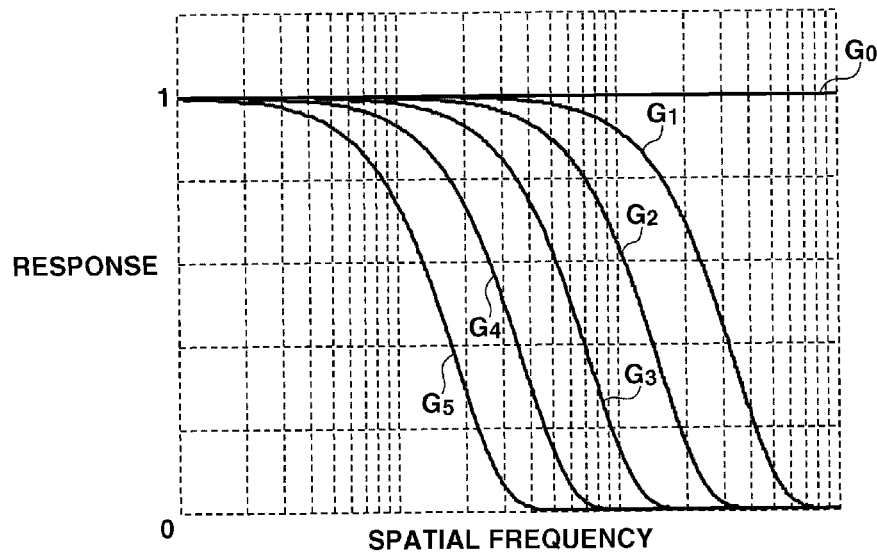
FIGS. 9A and 9B illustrate frequency characteristics of hierarchical images.
Figure 9B:
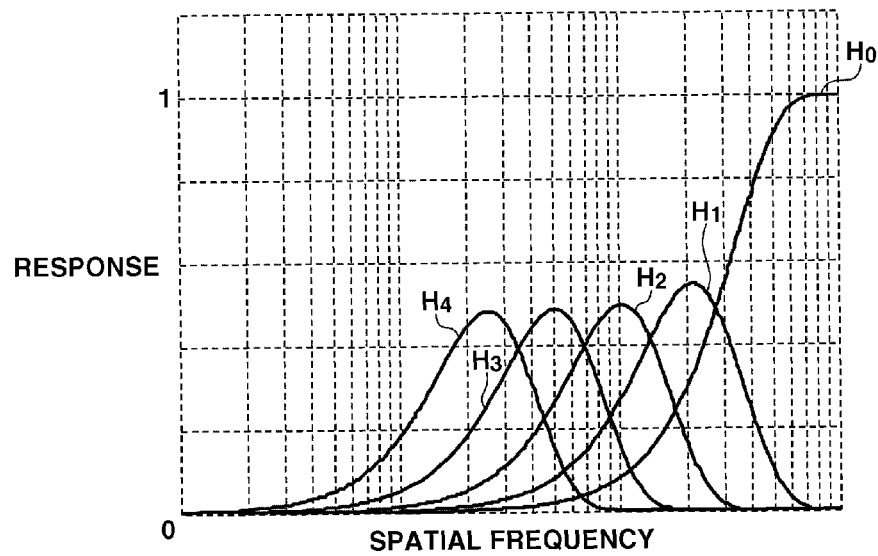

FIGS. 9A and 9B illustrate frequency characteristics of images generated as described above. As illustrated in FIGS. 9A and 9B, when the level "i" increases, the Gaussian image becomes an image constituted by low-frequency components of the input image. Further, the Laplacian image is an image constituted by a part of frequency bands of the input image. When the level "i" increases, the Laplacian image becomes an image including a lesser amount of low-frequency band components.

Next, in step S502, the filter unit 113 performs time-directional weighting addition processing using Gaussian images that precede the present target frame with the feedback coefficient "a." More specifically, the filter unit 113 performs weighting addition processing for all pixels, except for the level M, using the recursive filter according to the following formula.

$$Gr_{t-1,i}(x, y) = \begin{cases} G_{1,i}(x, y) & t = 2 \\ (1-a)\cdot G_{t-1,i}(x, y) + a\cdot Gr_{t-2,i}(x, y) & t > 2 \end{cases} \qquad \text{[Formula 26]}$$

Next, in step S503, the noise acquisition unit 114 generates a differential image $Dg_{t,i}$ by subtracting the Gaussian image $Gr_{t-1,i}$ of the preceding frame having been subjected to the time-directional weighting addition processing from a Gaussian image $G_{t,i}$ of the present target frame. More specifically, the noise acquisition unit 114 performs simple subtraction processing for all pixels, except for the level M, according to the following formula 27.

$$Dg_{t,i}(x,y)=G_{t,i}(x,y)-Gr_{t-1,i}(x,y) \qquad \text{[Formula 27]}$$

Next, in step S504, the statistic acquisition unit 115 estimates a noise variance $\sigma d_i^2$ superposed on the differential image $Dg_{t,i}$. If $\sigma g_i^2$ represents the noise variance superposed on the Gaussian image $G_{t,i}$ of the present target frame, the noise attenuation rate by the time-directional weighting addition processing is taken into consideration, the following formula 28 expresses the noise variance $\sigma d_i^2$ superposed on the differential image $Dg_{t,i}$.

$$\sigma d_i^2 = \sigma g_i^2 + \left\{ a^{2(t-2)} + (1-a)^2 \cdot \sum_{i=1}^{t-2} a^{2(i-1)} \right\} \cdot \sigma g_i^2 \quad \text{[Formula 28]}$$

In the above-described formula 28, "a" is the feedback coefficient having been set by a user via the operation unit 110.

The noise variance $\sigma g_i^2$ superposed on the Gaussian image $G_{t,i}$ of the present frame can be expressed by the following formula 29, similar to the first exemplary embodiment, when the noise variance $\sigma_F^2(V)$ superposed on the present target frame $F_t$ and the noise attenuation rate in the decomposition process are taken into consideration.

$$\sigma g_i^2(V) = R_i \cdot \sigma_F^2(V) \quad \text{[Formula 29]}$$

$$R_i = \|h1_i\|_2^2, \quad h1_i = \begin{cases} 1 & i = 0 \\ h1_{i-1} * (\uparrow 2^{i-1})h, & i > 0 \end{cases}$$

In the above-described formula 29, "h" is the filter matrix illustrated in FIG. 8B and $(\uparrow a)$ represents the a-times upsampling. Further, * represents the convolution.

The above-described formula takes a value dependent on the level "i" and the pixel value V. Accordingly, the noise variance $\sigma d_i^2$ superposed on the differential image $Dg_{t,i}$ takes a value dependent on the level "i" and the pixel value V.

The pixel value V can be obtained using the Gaussian image $G_{t,i}$, which is a weighted average of the present target frame $F_t$. Therefore, as actual processing, the statistic acquisition unit 115 calculates estimation values that corresponds to all pixels, except for the level M, based on a pixel value $G_{t,i}$ (x, y) of the Gaussian image $G_{t,i}$ of the level "i."

Next, in step S505, the testing unit 116 obtains a significance probability that indicates whether the differential image $Dg_{t,i}$ follows the probability distribution based on the noise statistic obtained by the statistic acquisition unit 115. As described above, the noise superposed on the differential image $Dg_{t,i}$ has a probability distribution (variance) that is variable depending on the level and is different for each pixel.

Therefore, in the present exemplary embodiment, the testing unit 116 designates, as the sample set $\Omega$, a range composed of arbitrary n×n pixels including the target pixel (x, y) of the level "i" at its central region and calculates a significance probability $P_i$ for all pixels of each level "i" with respect to the null hypothesis "the sample set $\Omega$ can follow the noise probability distribution $N(\mu, \sigma^2)$."

In the present exemplary embodiment, the population mean $\mu$ of the noise is 0. Regarding a population variance $\sigma^2$, a variance $\sigma d_i^2(V)$ that corresponds to the target pixel (x, y) of the level "i" obtained by the statistic acquisition unit 115 can be used as an estimation value. Further, an arbitrary size can be set for "n", e.g., n=3, in the in the present exemplary embodiment.

The method for calculating the significance probability that corresponds to the sample set $\Omega$ is similar to that described in the first exemplary embodiment, except that the test statistic T calculation method that corresponds to the population mean $\mu$ is changed to the following formula 30.

$$T = \frac{C \cdot (E - \mu)}{\sqrt{S^2 / 2n}} \quad \text{[Formula 30]}$$

Compared to the first exemplary embodiment, the above-described formula includes "C", which is a correction coefficient that enables the test statistic T obtained from the Gaussian image $G_{t,i}$ including spatially correlated noises to follow the t-distribution having (2n−1) degrees of freedom. More specifically, the calculation can be performed using the following formula 31 in which spatially noise correlation is taken into consideration.

$$C = \frac{\|m\|_2}{\|m_i\|_2 / \|h1_i\|_2} \quad \text{[Formula 31]}$$

$$h1_i = \begin{cases} 1 & i = 0 \\ h1_{i-1} * (\uparrow 2^{i-1})h, & i > 0, \end{cases}$$

$$m_i = h_i * (\uparrow 2^i)m$$

In the above-described formula 31, "h" is the filter matrix illustrated in FIG. 8B and $(\uparrow a)$ represents the a-times upsampling. Further, * represents the convolution.

Further, "m" represents an averaging filter matrix that has a size similar to a sample size. In the present exemplary embodiment, the sample set $\Omega$ is a 3×3 pixel range including the target pixel (x, y) at its central region. Therefore, the averaging filter matrix "m" can be expressed using the following formula.

$$m = \begin{bmatrix} 1/9 & 1/9 & 1/9 \\ 1/9 & 1/9 & 1/9 \\ 1/9 & 1/9 & 1/9 \end{bmatrix} \quad \text{[Formula 32]}$$

The testing unit 116 obtains the significance probability $P_i$ for all pixels, except for the level M, by integrating the above-described test statistic T that corresponds to the population mean p and test statistic $\chi^2$ that corresponds to the population variance $\sigma^2$, which can be obtained as described in the first exemplary embodiment.

The calculation processes of the above-described significance probability $P_i$ include decomposing an image into a plurality of frequency bands and obtaining a movement probability in each frequency band. Therefore, it is feasible to accurately detect a movement even in a non-rigid body motion that may cause different changes in respective frequencies.

Next, in step S206, the addition unit 117 sets a feedback coefficient "$am_i$" for all pixels, except for the level M. In the present exemplary embodiment, the addition unit 117 can set the feedback coefficient "$am_i$" for each level "i", as described in the first exemplary embodiment.

Next, in step S506, the image processing unit 112 performs space-directional weighting addition processing on all pixels of a Laplacian image $L_{t,i}$ of the present frame. In the present exemplary embodiment, the image processing unit 112 extracts a noise from the Gaussian image Gt,i that is similar to the Laplacian image $L_{t,i}$ of the same level based on the principle similar to the ε-filter. The image processing unit 112 performs weighting addition processing suppressing the unsharpness of the structure by subtracting the extracted noise from Laplacian image $L_{t,i}$ of the present frame. More specifically, the image processing unit 112 performs the space-directional weighting addition processing according to the following formula 33.

$$Ls_{t,i}(x, y) = L_{t,i}(x, y) - \sum_{i=-N}^{N} \sum_{j=-N}^{N} h2 \quad \text{[Formula 33]}$$

$$(i+N, j+M) \cdot k\{G_{t,i}(x, y) - G_{t,i}(x+i, y+j)\}$$

$$h2 = h * h, \; k(x) = \begin{cases} x & |x| \le \varepsilon \\ -\varepsilon & x < -\varepsilon \\ \varepsilon & x > \varepsilon \end{cases}$$

In the above-described formula 33, "h" is the filter matrix illustrated in FIG. 8B.

In the above-described formula 33, the second term on the right side is an estimation of the noise with respect to the ε value, when the frequency band is similar to the Laplacian image $L_{t,i}$. In the present exemplary embodiment, the ε value is a threshold that determines whether the target pixel (x, y) has a pixel value (except for a noise component) similar to that of a neighboring pixel. The ε value can be set using the following formula 34, in which the noise variance $\sigma_F^2(V)$ superposed on the present target frame $F_t$ and the noise attenuation rate in the decomposition process are taken into consideration.

$$\varepsilon = 3 \cdot \|h_i * d_i\|_2 \cdot \sqrt{\sigma_F^2(V)} \quad \text{[Formula 34]}$$

$$h_i = \begin{cases} 1 & i = 0 \\ h_{i-1} * (\uparrow 2^{i-1})h & i > 0, \end{cases}$$

$$d_i = (\uparrow 2^i), d = [-1 \; 1]$$

In the above-described formula 34, "h" is the filter matrix illustrated in FIG. 8B and ($\uparrow$a) · represents the a-times upsampling. Further, * represents the convolution.

As described above, the image processing unit 112 performs the above-described processing for all pixels, except for the level M, and performs the space-directional weighting addition processing based on the ε value.

Next, in step S507, the image processing unit 112 generates a Laplacian image $Lo_{t,i}$ of the present frame having been subjected to the time/space directional weighting addition processing, using a Laplacian image $Ls_{t,i}$ of the present frame having been subjected to the space-directional weighting addition processing and the feedback coefficient "am" obtained in step S206. More specifically, the image processing unit 112 performs processing according to the following formula for all pixels of each level "i."

$$Ho_{t,i}(x, y) = (1 - am) \cdot \{(1 - b) \cdot H_{t,i}(x, y) + b \cdot Hs_{t,i}(x, y)\} + \quad \text{[Formula 35]}$$

$$am \cdot Hr_{t-1,i}(x, y)$$

$$Hr_{t-1,i}(x, y) = \begin{cases} H_{1,i}(x, y) & t = 2 \\ (1-a) \cdot H_{t-1,i}(x, y) + a \cdot Hr_{t-2,i}(x, y) & t > 2 \end{cases}$$

In the above-described formula 35, the contribution ratio "b" can be set based on the noise attenuation rate Ro defined by the above-described formula, as described in the first exemplary embodiment.

Next, in step S508, the reconstruction unit 402 generates a present frame $Fo_t$ having been subjected to the time/space directional weighting addition processing using the Laplacian image $Lo_{t,i}$ of the present frame having been subjected to the time/space directional weighting addition processing and a Gaussian image $G_{m,i}$ of the level M. In the present exemplary embodiment, considering the decomposition of hierarchical images having been performed using the Burt-Adelson pyramid algorithm, the reconstruction unit 402 performs reconstruction processing using the inverse conversion.

The reconstruction of the pyramid algorithm is described below with reference to FIGS. 8B and 8C. FIG. 8C illustrates one-level reconstruction relating to a Laplacian image $L_i$ of the level "i" and a Gaussian image $G_{i+1}$ of the level "i+1." First, a 0 value is inserted to the Gaussian image $G_{i+1}$ by a 2-times upsampling 85. The Gaussian image $G_{i+1}$ is then filtered by a filter 86, whose filter coefficients are four times the filter coefficients illustrated in FIG. 8B, to generate an image whose resolution is doubled in both the vertical and horizontal directions.

Then, an adder 87 adds the Laplacian image $L_i$ and the output image of the filter 86 to generate a reconstructed Gaussian image $G_i$ of the level "i." Through the above-described operation, it becomes feasible to reconstruct the Gaussian image $G_i$ of the level "i" from the Laplacian image $L_i$ of the level "i" and the Gaussian image $G_{i+1}$ of the level "i+1."

Further, if a multi-level reconstruction is required, it can be realized by repeating similar processing on the output Gaussian image $G_i$ and a lower-level Laplacian image $L_{i-1}$ (which are designated as input images).

In the present exemplary embodiment, the reconstruction unit 402 generates the noise-reduced present frame $Fo_t$ by repeating the above-described processing M times, while inputting the Laplacian image {$Lo_{t,i}$|i=0, 1, . . . M−1} of the present frame subjected to the time/space directional weighting addition processing and the unprocessed Gaussian image $G_{m,i}$ of the level M.

Next, in step S209, the image processing unit 112 determines whether the noise reduction processing has been completed for all frames. If it is determined that the noise reduction processing for all frames has not yet been completed (NO in step S209), then in step S210, the image processing unit 112 sets the next frame as the present target frame by incrementing the variable "t" and repeats the above-described sequential processing in steps S501 to S508. If it is determined that the noise reduction processing has been completed for all frames (YES in step S209), the image processing unit 112 terminates the processing of the flowchart illustrated in FIG. 5.

As described above, the image processing according to the third exemplary embodiment is characterized by decomposing an image into a plurality of frequency bands and obtaining significance probabilities that correspond to respective frequency bands. Thus, it is feasible to accurately determine a movement even in a non-rigid body motion that may cause different changes in respective frequencies. The image processing according to the third exemplary embodiment can realize optimum time/space-directional weighting addition processing, as understood from the comparison with the first exemplary embodiment.

Figure 6:
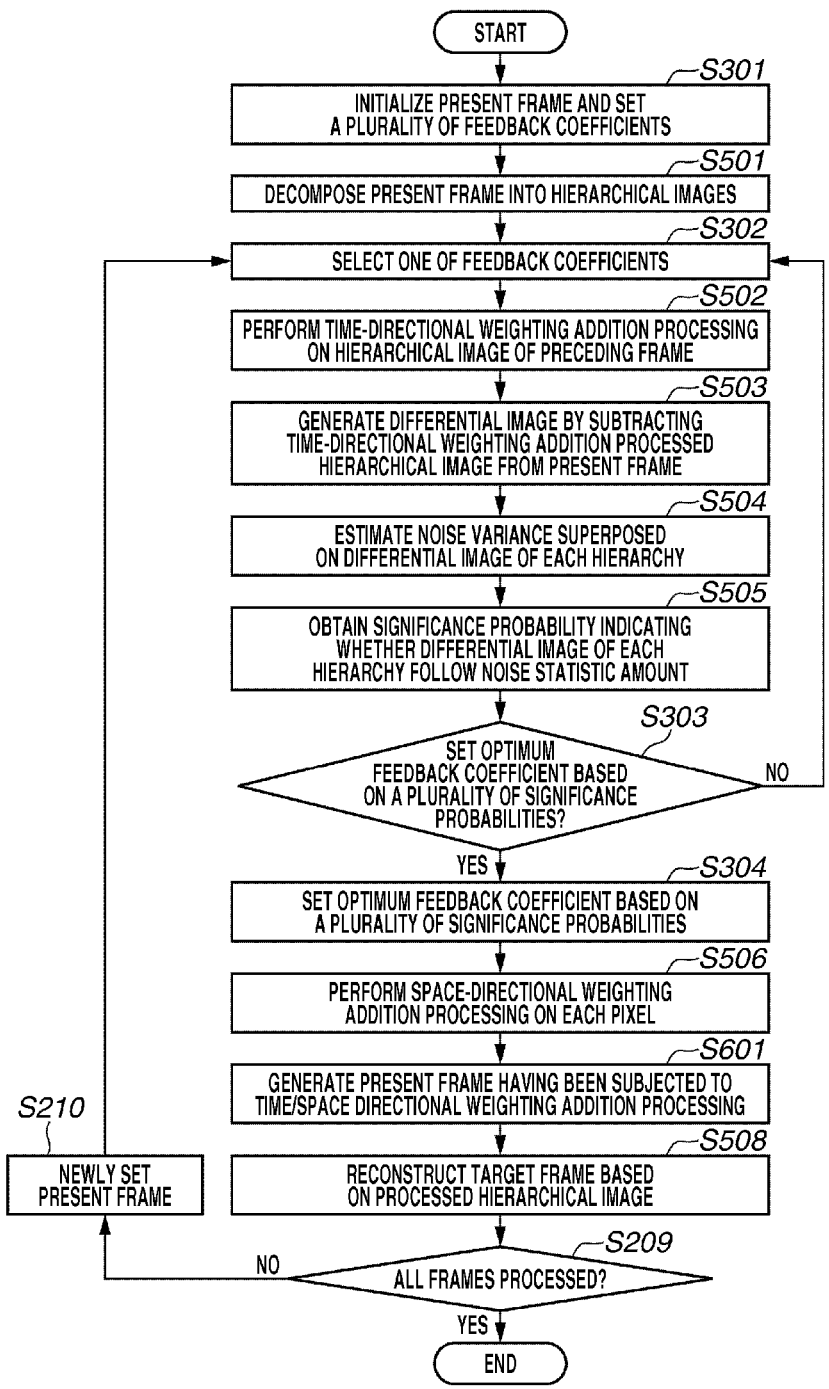
FIG. 6 is a flowchart illustrating an example procedure of the processing that can be performed by the image processing unit 112 according to the fourth exemplary embodiment of the present invention.

FIG. 6 is a flowchart illustrating an operation that can be performed by the image processing unit 112 of the X-ray moving image capturing apparatus 400 according to a fourth exemplary embodiment of the present invention. The fourth exemplary embodiment is different from the third exemplary embodiment in that the configuration described in the second exemplary embodiment is additionally provided.

Accordingly, in the flowchart illustrated in FIG. 6, each step if it executes processing similar to that described in FIG. 3 or FIG. 5 is denoted by the same step number. In the present exemplary embodiment, only the limited configuration features different from those described in the second exemplary embodiment or in the third exemplary embodiment are described in detail below.

First, in step S301, the image processing unit 112 sets t=2 to designate the present target frame Ft to start processing. The image processing unit 112 further sets a plurality of feedback coefficients $\{a_i | i=1, 2, \ldots, n\}$.

Next, in step S501, the decomposition unit 401 decomposes the present target frame $F_t$ into a plurality of hierarchical images that are differentiated in resolution.

Next, in step S302, the image processing unit 112 selects one of the plurality of feedback coefficients having been set. Subsequently, the image processing unit 112 performs sequential processing in steps S502 to S505, as described above in the third exemplary embodiment, to obtain a significance probability.

In step S303, the image processing unit 112 determines whether the above-described sequential processing has been repeated for all feedback coefficients to obtain a significance probability $\{P_i | i=1, 2, \ldots, n\}$ that corresponds to each feedback coefficient $\{a_i | i=1, 2, \ldots, n\}$.

Next, in step S304, the addition unit 117 sets an optimum feedback coefficient "am", which can be selected from the plurality of feedback coefficients $\{a_i | i=1, 2, \ldots, n\}$, as described in the second exemplary embodiment.

As described above, by performing the above-described processing for all pixels, the addition unit 117 sets the feedback coefficient "am" based on a plurality of significance probabilities $\{P_i | i=1, 2, \ldots, n\}$.

Next, in step S506, the addition unit 117 performs space-directional weighting addition processing on all pixels of the Laplacian image $L_{t,i}$ of the present target frame. Further, in step S601, the image processing unit 112 generates a Laplacian image $Lo_{t,i}$ of the present frame having been subjected to time/space directional weighting addition processing, using the Laplacian image $Ls_{t,i}$ having been subjected to the space-directional weighting addition processing and the feedback coefficient "am" obtained in step S304. More specifically, the image processing unit 112 performs processing according to the following formula for all pixels of each level $$Ho_{t,i}(x, y) = (1 - am) \cdot \{(1 - b) \cdot H_{t,i}(x, y) + b \cdot Hs_{t,i}(x, y)\} + am \cdot Hr_{t-1,i}(x, y)$$ [Formula 36]

$$Hr_{t-1,i}(x, y) = \begin{cases} H_{1,i}(x, y) & t = 2 \\ (1 - am) \cdot H_{t-1,i}(x, y) + am \cdot Hr_{t-2,i}(x, y) & t > 2 \end{cases}$$

In the above-described formula 36, the contribution ratio "b" can be set based on the noise attenuation rate Ro defined by the above-described formula, as described in the first exemplary embodiment.

According to the above-described formula, if am=0, the image processing unit 112 does not perform the time-directional weighting addition processing and performs only the space-directional weighting addition processing. Therefore, if the testing unit 116 sets am=0 for the optimum feedback coefficient (except for a case where all of the feedback coefficients is discarded and am=0 is set), information relating to a Laplacian image $H_{t-1,i}$ of the immediately preceding frame is not used even if there is not any signal change caused by the movement of a measuring object person between the image of the present frame $F_t$ and the Laplacian image $H_{t-1,i}$ of the immediately preceding frame $F_{t-1}$.

Therefore, in this case, the image processing unit 112 can perform exceptional processing according to the following formula 37.

$$Ho_{t,i}(x,y) = (1-a) \cdot H_{t,i} + a \cdot Ho_{t-1,i}(x,y)$$ [Formula 37]

In the above-described formula 37, "a" is the feedback coefficient having been set by a user via the operation unit 110. Further, $Ho_{t-1,i}$ represents the Laplacian image of the preceding frame subjected to the time/space directional weighting addition processing.

The above-described formula 37 is characterized by performing weighting addition processing on the Laplacian image $Ho_{t-1,i}$ of the preceding frame having been subjected to the time/space directional weighting addition processing, instead of executing only the space-directional weighting addition processing. In other words, the processing according to the above-described formula 37 can suppress the unsharpness of a structure (e.g., an edge boundary) because time-directional information can be used additionally.

Next, in step S508, the reconstruction unit 402 generates a present frame $Fo_t$ having been subjected to the time/space directional weighting addition processing, using the Laplacian image $Lo_{t,i}$ of the present frame having been subjected to the time/space directional weighting addition processing and a Gaussian image $G_{m,i}$ of the level M.

Next, in step S209, the image processing unit 112 determines whether the noise reduction processing has been completed for all frames. If it is determined that the noise reduction processing for all frames has not yet been completed (NO in step S209), then in step S210, the image processing unit 112 sets the next frame as the present target frame by incrementing the variable "t" and repeats the above-described sequential processing in steps S302 to S508. If it is determined that the noise reduction processing has been completed for all frames (YES in step S209), the image processing unit 112 terminates the processing of the flowchart illustrated in FIG. 6.

As described above, the image processing according to the fourth exemplary embodiment selects a feedback coefficient having a least-probability risk based on a plurality of significance probabilities, or a feedback coefficient capable of bringing largest noise suppression effects among a plurality of low-probability risk feedback coefficients. Therefore, the image processing according to the fourth exemplary embodiment can set an optimum feedback coefficient, as understood from the comparison with the image processing described in the third exemplary embodiment.

Although the present invention has been described with reference to some exemplary embodiments, the present invention is not limited to the illustrated exemplary embodiments. Therefore, each exemplary embodiment can be appropriately modified in various ways within the scope of the present invention.

Further, to realize the present invention, it is useful to supply a software program capable of realizing the functions of the above-described exemplary embodiments (e.g., a program that corresponds to the flowchart illustrated in the drawings in the above-described exemplary embodiments) directly or remotely to a system or an apparatus and to enable a computer of the system or the apparatus to read supplied program codes and execute the readout program.

Accordingly, the program code itself installed on a computer to cause the computer to realize functional processing according to the present invention can realize the present invention. In other words, the present invention encompasses a computer program itself that can realize the functional processing according to the present invention.

A recording medium supplying the program can be selected, for example, from any one of a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a digital versatile disc (DVD (e.g., DVD-ROM, DVD-R)).

The method for supplying the program includes accessing a website on the Internet using the browser installed on a client computer, when the website allows each user to download the computer program itself of the present invention, or compressed files having automatic installation functions, to a hard disk or other comparable recording medium of the user.

Further, the program code constituting the program of the present invention is dividable into a plurality of files so that respective files can be downloaded from different websites. More specifically, the present invention encompasses World Wide Web (WWW) servers that allow numerous users to download the program files so that their computers can realize the functions or processes according to the present invention.

Further, encrypting the program according to the present invention and storing the encrypted program on a CD-ROM or a comparable storage medium is an exemplary method employable when the program is distributed to users. The authorized users (i.e., users satisfying predetermined conditions) are allowed to download key information from a website via the Internet. The users can decrypt the program with the obtained key information and can install the program on their computers.

When the computer reads and executes the readout program, the computer can realize the functions of the above-described exemplary embodiments. Further, an operating system (OS) or other application software running on a computer can execute a part or the whole of actual processing based on instructions of the program to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-189024 filed Aug. 31, 2011, which is hereby incorporated by reference herein in its entirety.

What is claimed is:

1. An image processing apparatus that can perform time-sequential weighting addition processing on a moving image constituted by a plurality of frames, the apparatus comprising:
   a decomposition unit configured to generate decomposed image data of a plurality of different frequency bands;
   a filter unit configured to obtain an image by performing recursive filter processing on a preceding frame that precedes a present target frame of the decomposed image data, which is one of the plurality of frames of the decomposed image data constituting the moving image;
   a coefficient acquisition unit configured to acquire a weighting coefficient for the present target frame of the decomposed image data based on a noise statistic of a differential image data between an image of the present target frame of the decomposed image data and the image of the preceding frame of the decomposed image data obtained by the filter unit in different frequency bands; and
   a reconstruction unit configured to reconstruct image data of a plurality of different frequency bands,
   wherein the filter unit adds the present target frame of the decomposed image data with the weighting coefficient acquired by the coefficient acquisition unit to the preceding frame of the decomposed image data.

2. The image processing apparatus according to claim 1, wherein the noise statistic of the differential image is a noise variance superposed on the differential image.

3. The image processing apparatus according to claim 1, wherein the coefficient acquisition unit is configured to obtain the weighting coefficient based on an evaluation value that indicates whether the noise statistic of the differential image data follows a noise distribution obtained beforehand.

4. The image processing apparatus according to claim 1, further comprising:
   a testing unit configured to obtain a significance probability that indicates whether the noise statistic follows a noise probability distribution,
   wherein the filter unit is further configured to obtain the weighting coefficient based on the significance probability.

5. The image processing apparatus according to claim 4, further comprising:
   a statistic acquisition unit configured to acquire the noise statistic of the differential image data,
   wherein the testing unit is further configured to obtain the significance probability that indicates whether the noise statistic follows a probability distribution acquired beforehand.

6. The image processing apparatus according to claim 4, wherein the testing unit is further configured to calculate the significance probability based on a sample set having a predetermined range of pixels including each pixel of an image of the present target frame at its central region.

7. The image processing apparatus according to claim 6, wherein the significance probability indicates whether a population mean of the sample set follows a probability distribution based on the noise statistic.

8. The image processing apparatus according to claim 6, wherein the significance probability indicates whether a population variance of the sample set can follow a probability distribution based on the noise statistic.

9. The image processing apparatus according to claim 6, wherein the significance probability indicates whether both a population mean and a population variance of the sample set can follow a probability distribution based on the noise statistic.

10. The image processing apparatus according to claim 1, wherein the image data is decomposed by the decomposition unit.

11. The image processing apparatus according to claim 10, wherein the reconstruction unit is configured to perform reconstruction processing based on the image data added by the filter unit.

12. The image processing apparatus according to claim 1, wherein the noise statistic is at least one of mean value, standard deviation, and variance of the noise.

13. The image processing apparatus according to claim 1, further comprising:
a space filter unit configured to perform space filter processing on image data of the present target frame in a space direction,
wherein the addition unit is further configured to perform addition processing on the image data having been subjected to the space filter processing.

14. The image processing apparatus according to claim 13, wherein a processing effect of the space filter processing to be performed by the space filter unit is changed according to the evaluation value.

15. The image processing apparatus according to claim 1, wherein at least one of:
(i) the decomposition unit further operates to generate the decomposed image data into at least one Laplacian image;
(ii) the decomposition unit further operates to generate the decomposed image data into at least one Laplacian image and at least one Gaussian image;
(iii) the at least one Laplacian image is an image constituted or comprising at least a part of the plurality of different frequency bands;
(iv) the at least one Laplacian image comprises a plurality of Laplacian images wherein each of the plurality of Laplacian images has a different amount of low-frequency band components;
(v) the at least one Laplacian image comprises a plurality of Laplacian images wherein at least one of the plurality of Laplacian images has a lesser amount of low-frequency band components than at least another of the plurality of Laplacian images;
(vi) wherein the filter unit performs space-directional weighting addition processing on all pixels of the at least one Laplacian image of the present target frame, and generates at least one Laplacian image of the present frame having been subjected to time/space directional weighting addition processing, using the at least one Laplacian image having been subjected to the space-directional weighting addition processing and the weighting coefficient acquired by the coefficient acquisition unit;
(vii) the space-directional weighting addition processing operates to suppress an unsharpness of a structure by subtracting an extracted noise from the at least one Laplacian image of the present frame; and
(viii) the structure comprises at least an edge boundary of the at least one Laplacian image.

16. An image processing method for performing time-sequentially weighting addition processing on a moving image constituted by a plurality of frames, the method comprising:
generating decomposed image data of a plurality of different frequency bands;
obtaining an image by performing recursive filter processing on a preceding frame that precedes a present target frame of the decomposed image data, which is one of the plurality of frames of the decomposed image data constituting the moving image;
acquiring a weighting coefficient for the present target frame of the decomposed image data based on a noise statistic of a differential image data between an image of the present target frame of the decomposed image data and the image of the preceding frame of the decomposed image data obtained in different frequency bands through the filter processing;
reconstructing image data of a plurality of different frequency bands; and
adding the present target frame of the decomposed image data with the acquired weighting coefficient to the preceding frame of the decomposed image data.

17. The image processing method according to claim 16, wherein the noise statistic of the differential image is a noise variance superposed on the differential image.

18. The image processing method according to claim 16, wherein at least one of:
(i) the generated decomposed image data includes at least one Laplacian image;
(ii) the generated decomposed image data includes at least one Laplacian image and at least one Gaussian image;
(iii) the at least one Laplacian image is an image constituted or comprising at least a part of the plurality of different frequency bands;
(iv) the at least one Laplacian image comprises a plurality of Laplacian images wherein each of the plurality of Laplacian images has a different amount of low-frequency band components;
(v) the at least one Laplacian image comprises a plurality of Laplacian images wherein at least one of the plurality of Laplacian images has a lesser amount of low-frequency band components than at least another of the plurality of Laplacian images;
(vi) wherein the image processing method further comprises performing space-directional weighting addition processing on all pixels of the at least one Laplacian image of the present target frame, and generating at least one Laplacian image of the present frame having been subjected to time/space directional weighting addition processing, using the at least one Laplacian image having been subjected to the space-directional weighting addition processing and the acquired weighting coefficient;
(vii) the space-directional weighting addition processing operates to suppress an unsharpness of a structure by subtracting an extracted noise from the at least one Laplacian image of the present frame; and
(viii) the structure comprises at least an edge boundary of the at least one Laplacian image.

19. A non-transitory computer-readable storage medium storing a program that causes a computer to execute the image processing method according to claim 16.

20. An image processing apparatus that can perform time-sequential weighting addition processing on a moving image constituted by a plurality of frames, the apparatus comprising:
a filter unit configured to obtain an image by performing recursive filter processing on a frame image that precedes a present target frame, which is one of the plurality of frames constituting the moving image;
a coefficient acquisition unit configured to acquire a weighting coefficient for the present target frame based on a noise statistic of a differential image between an image of the present target frame and the image obtained by the filter unit;
an addition unit configured to perform addition processing on the moving image constituted by the plurality of frames based on the weighting coefficient acquired by the coefficient acquisition unit; and
a testing unit configured to obtain a significance probability that indicates whether the noise statistic follows a noise probability distribution,
wherein: (i) the addition unit is further configured to obtain the weighting coefficient based on the significance probability; and (ii) the testing unit is further configured to calculate the significance probability based on a sample set having a predetermined range of pixels including each pixel of an image of the present target frame at its central region.

21. The image processing apparatus according to claim 20, wherein: (i) the significance probability indicates whether a population mean of the sample set follows a probability distribution based on the noise statistic; (ii) the significance probability indicates whether a population variance of the sample set can follow a probability distribution based on the noise statistic; or (iii) the significance probability indicates whether both a population mean and a population variance of the sample set can follow a probability distribution based on the noise statistic.

* * * * *